Sept. 5, 1933.   C. J. BRISTOL   1,925,432
WHEEL GUIDE FOR MOTOR VEHICLE SERVICING HOISTS
Filed July 20, 1931
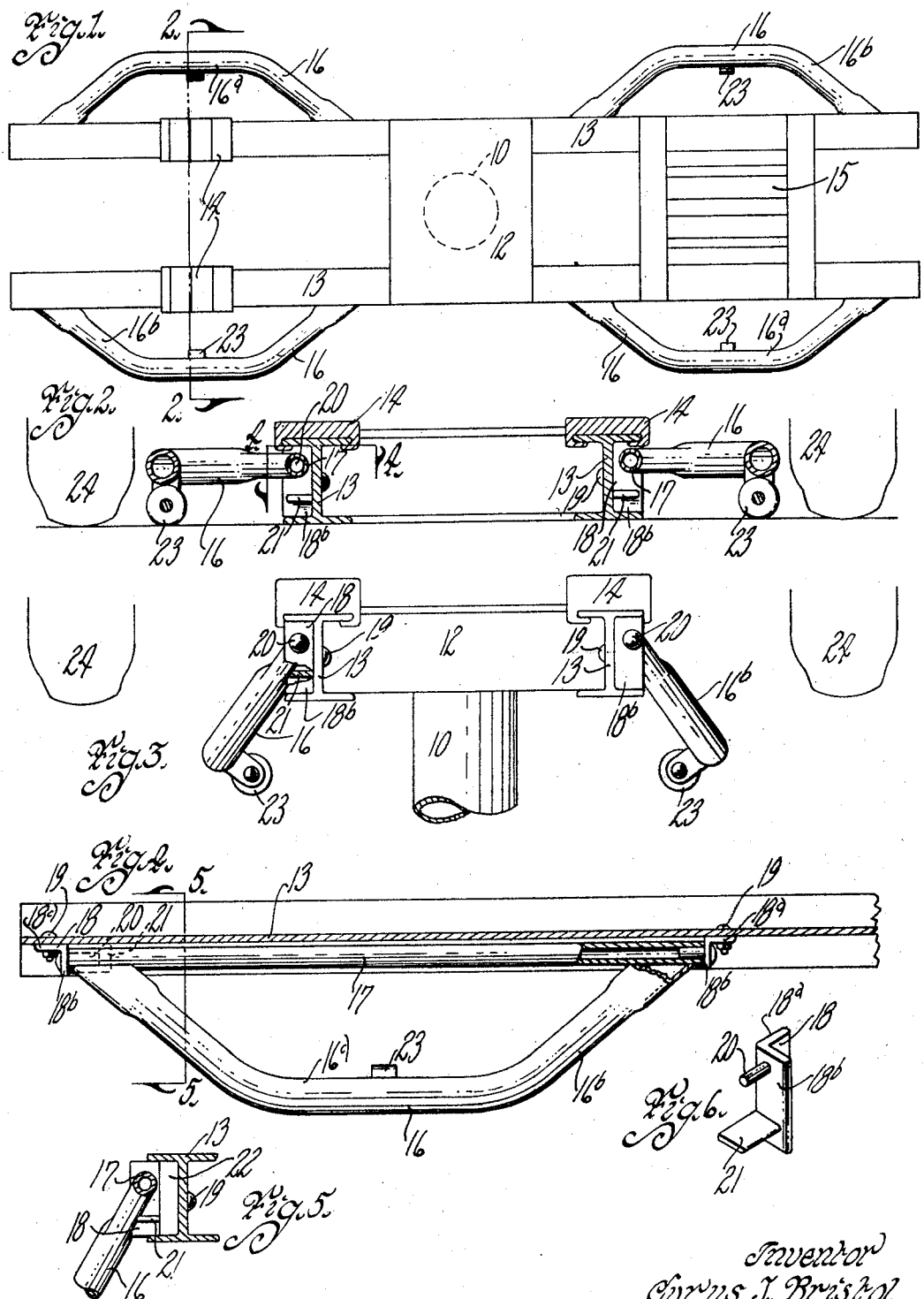

Patented Sept. 5, 1933

1,925,432

UNITED STATES PATENT OFFICE 1,925,432

WHEEL GUIDE FOR MOTOR VEHICLE SERVICING HOISTS

Cyrus John Bristol, Des Moines, Iowa, assignor to Globe Machinery and Supply Company, Des Moines, Iowa, a corporation of Iowa Application July 20, 1931. Serial No. 551,969

2 Claims. (Cl. 254—89)

My invention relates to a wheel guide for automobile servicing hoists, particularly of the free-wheel type.

It is my purpose to provide such a wheel guide so arranged that the parts will automatically adopt a wheel guide position when the hoist is lowered for guiding an automobile to keep it properly spaced laterally with relation to the hoist, when the automobile is driven to position for servicing and so mounted as to automatically drop to position out of the way when the hoist is raised.

Another object is to provide wheel guides of the kind mentioned carrying rollers or the like in such position that the rollers will not be injured by vehicle wheels and yet will serve to engage the ground for facilitating the spreading of the wheel guides when the hoist is lowered.

Still another purpose is to provide a novel mounting for such a guide by which the guide will be held when the hoist is raised in position to be automatically spread when the hoist is again lowered.

Still another purpose is to provide such a hoist which can be very economically adapted for use with vehicles of different widths of tread.

With these and other objects in view, my invention consists in the construction, arrangement and combination of the various parts of my wheel guide for motor vehicle servicing hoists, whereby the objects contemplated are attained, as hereinafter more fully set forth, pointed out in my claims, and illustrated in the accompanying drawing, in which:

Figure 1 is a top or plan view of a vehicle hoist equipped with wheel guides embodying my invention.

Figure 2 is a detail, sectional view taken on the line 2—2 of Figure 1.

Figure 3 is an end elevation of the hoist in raised position, parts being broken away and parts being shown in section.

Figure 4 is a detail, sectional view taken on the line 4—4 of Figure 2.

Figure 5 is a detail, sectional view taken on the line 5—5 of Figure 4; and

Figure 6 is a perspective view of one of the brackets for mounting the wheel guide on the hoist.

In recent years, automobile hoists of the kind in which a frame is mounted on a tubular piston for vertical reciprocation have gone into general use. These hoists are usually of two sorts,— either "drive-on" or "free-wheel".

In the drawing, I have shown a free-wheel hoist having the piston indicated by the reference numeral 10 with the head 12 and the longitudinal frame members 13 in the form of I-beams. These are usually provided on one side of the head with axle supports 14 and on the other side with a cradle or the like 15 for the rear axle housing or the differential housing.

It is always an object in manufacturing hoists to afford as much free space under the car when the hoist is raised for lifting the car as possible. For this reason and because cars vary somewhat in construction, it has become the necessary practice in making free-wheel hoists to place the beams 13 rather close together. This makes it important to properly center the automobile from side to side when it is driven to position above the hoist, so that the load will be evenly distributed when the hoist is raised and danger of tipping the automobile and incurring an accident may be avoided.

In order to properly guide the motor vehicle so that it will be in proper position above the hoist, I have provided the wheel guides of the present application.

I preferably provide four of these wheel guides, so as to leave a maximum of free space and thus interfere as little as possible with the servicing of the motor vehicle.

These wheel guides are of such length and are so mounted on the beams 13 that they will serve for practically all makes of cars, regardless of variations in tread and wheel base.

Since the four wheel guides are of similar construction, I shall describe only one of them in detail.

The wheel guide comprises a wheel guiding element 16 preferably composed of a sturdy piece of pipe, having a central portion 16a, arranged substantially parallel with the adjacent beam 13 and the end portions 16b inclined from the portion 16a toward the beam 13.

The ends of the portions 16b are properly shaped and are welded to a smaller pipe or the like 17 which in the final installation lies alongside the beam 13 between the upper and lower flanges thereof and preferably somewhat nearer the upper flange.

For securing the wheel guide unit composed of the members 16 and 17 to the I-beam frame member 13, I provide simple brackets, one of which will now be described. Each bracket comprises an upright angle bar 18, the flange 18a of which is designed to be secured to the central shank portion of the I-beam 13 by means of a single bolt 19.

The angle bar 18 is of such length as to fit snugly between the flanges of the I-beam.

The flange 18b extends outwardly away from the shank 13 between the upper and lower flanges of the I-beam as shown for instance in Figure 3.

Projecting from the upper portion of the flange 18b is a pintle 20, which in practice I have mounted on the bar 18 by welding.

Similarly projecting from the flange 18b below the pintle 20 is a lug or plate 21.

In installation the pintles 20 are inserted into the opposite ends of one of the pipes 17 as best illustrated perhaps in Figure 4, and the bolts 19 are then placed in position in proper holes in the I-beam and bar 18.

The pipe 17 can turn on the pintles 20 and thus there is provided a very simple and economical construction for the wheel guide and its mounting bracket.

There has been a tendency to slightly widen the wheel treads of motor vehicles and there is now some variation in wheel treads in the various makes of cars. My wheel guide structure is primarily made for the narrowest tread standard car and will possibly serve for all makes of cars.

However, in order to adapt it for the best adjustment for wide tread cars, I provide in connection with the brackets 18 filler blocks 22, as illustrated in Figure 5 to be interposed between the flange 18a and the shank of the I-beam for thus mounting the wheel guide a little farther out from the hoist.

At about the center of each wheel guide 16, I provide a bracket projecting from the portion 16a and which when the wheel guide is in horizontal position extends practically straight downward, as shown best in Figure 2, and supports an anti-friction roller 23.

Operation

The parts are so constructed and arranged that when the hoist is lowered, the wheel guides stand substantially in the position shown in Figure 2 with the member 16 in horizontal position projecting outwardly from the rails or I-beam frame members 13 and with the roller 23 resting on the floor.

When the wheel guides are in this position and the motor vehicle is driven to position for being serviced upon the hoist, it will be observed that if the motor vehicle is not properly centered with relation to the hoist, the motor vehicle wheels will strike the guides and tend to ride up on them and on account of the inclination of the members 16b will be slid laterally to position where the motor vehicle is practically centered from side to side on the hoist. Then when the hoist is raised, the load will be properly distributed and there will be no danger of accidentally tipping the motor vehicle off the hoist.

I have shown in Figures 2 and 3, for instance, in a diagrammatic fashion, the wheels 24 of the motor vehicle.

By the use of such guides, certain dangers inherent in some free-wheel hoists have been practically eliminated.

It will be noted that I have secured the advantages of a wheel guide structure with a minimum of interference with the free space under the vehicle on the hoist.

By using four of the wheel guides, I have left the space between the two forward wheel guides and the two rearward wheel guides entirely open.

By providing the peculiar form of structure herein explained, there is afforded a wheel guide which when the hoist rises will drop from the position shown in Figure 2 to the position shown in Figure 3. The wheel guides are then inclined laterally and outwardly. The portions 16b near their ends strike the lugs or plates 21 as the hoist rises. These lugs 21 serve as stops and limit the downward swinging movement of the guides so that the guides are always inclined when the hoist is raised to such a position that when the hoist is lowered, the roller 23 will strike the floor and cause the hoist members to spread from the position shown in Figure 3 to the position shown in Figure 2 as the hoist drops to its lowermost position.

When the hoist is up, the wheel guides as nearly as possible are out of the way. Whenever the hoist is down, they automatically move to position for performing their desired function.

The wheel guides thus efficiently serve their purpose and guide the motor vehicle to position where its load will be properly distributed on the hoist.

However, when the hoist is raised, the wheel guides drop down to position where they are nearly entirely out of the way and where they will result in a minimum of interference with the working space under the motor vehicle.

The parts are exceedingly simple and cheap and the installation may be easily and economically made and yet the structure has ample strength for the purposes for which it has been intended.

Some changes may be made in the construction and arrangement of the various parts of my wheel guide, and it is my intention to cover by my claims any such modifications in structure or use of mechanical equivalents, as may reasonably come within their scope.

I claim as my invention:

1. In a hoist for servicing motor vehicles having spaced longitudinal frame members having outwardly projecting vertically spaced flanges, a plurality of wheel guides each comprising brackets secured to the outer faces of the frame members and snugly fitting between said flanges and having outwardly projecting parallel flanges, a member journaled between said brackets in the outwardly extending flanges thereof, a pipe bent to a substantial U-shape with a straight central portion and with arms inclined to and secured to said member adjacent the ends thereof.

2. In a hoist, spaced parallel horizontal frame members, a plurality of wheel guides, each comprising angle brackets mounted on the outer face of one of the frame members and spaced longitudinally thereof and having outwardly extending flanges, pintles on said flanges projecting toward each other, stops on said last-named flanges below the pintles, a pipe arranged parallel with the frame member having its ends journaled on said pintles and a second pipe having a central straight portion and spaced end portions inclined to and secured to said first pipe near the ends thereof.

CYRUS JOHN BRISTOL.